United States Patent
Miller et al.

(10) Patent No.: US 10,458,382 B2
(45) Date of Patent: Oct. 29, 2019

(54) AUTO STOP PARAMETER THRESHOLD ADJUSTMENT

(71) Applicant: Ford Global Technologies, LLC, Dearborn, MI (US)

(72) Inventors: Kenneth James Miller, Canton, MI (US); Thomas G. Leone, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 704 days.

(21) Appl. No.: 14/686,809

(22) Filed: Apr. 15, 2015

(65) Prior Publication Data
US 2016/0305388 A1 Oct. 20, 2016

(51) Int. Cl.
*F02N 11/08* (2006.01)

(52) U.S. Cl.
CPC ...... *F02N 11/0818* (2013.01); *F02N 11/0822* (2013.01); *F02N 11/0837* (2013.01); *F02N 2200/0801* (2013.01); *F02N 2200/101* (2013.01); *F02N 2200/102* (2013.01); *F02N 2200/105* (2013.01); *F02N 2300/2004* (2013.01); *Y02T 10/48* (2013.01)

(58) Field of Classification Search
CPC ............ F02N 11/0818; F02N 11/0837; F02N 11/0822; F02N 11/0833; F02N 11/0814; F02N 2200/101; F02N 2200/102; F02N 2200/123; F02N 2200/0801; F02N 2300/2004; F02N 2300/0801

USPC ........................................... 123/179.3, 179.4
See application file for complete search history.

(56) References Cited

U.S. PATENT DOCUMENTS

| | | | |
|---|---|---|---|
| 8,594,912 B2 | 11/2013 | Weaver | |
| 8,855,896 B2 | 10/2014 | Ma et al. | |
| 2010/0175936 A1* | 7/2010 | Schneider | B60W 10/06 180/65.28 |
| 2011/0005486 A1* | 1/2011 | Nakamura | F02N 11/0837 123/179.4 |
| 2012/0277982 A1* | 11/2012 | Weaver | F02N 11/0837 701/112 |
| 2012/0330529 A1* | 12/2012 | Pebley | F02N 11/084 701/101 |
| 2013/0035839 A1* | 2/2013 | Otanez | F02N 11/0837 701/102 |
| 2013/0124066 A1* | 5/2013 | Pebley | B60W 10/26 701/102 |
| 2013/0245925 A1* | 9/2013 | Malone | F02N 11/0818 701/113 |
| 2013/0271276 A1* | 10/2013 | Okada | F02N 11/0814 340/441 |
| 2013/0291830 A1* | 11/2013 | Doering | F02D 41/023 123/350 |
| 2014/0073478 A1 | 3/2014 | Hashemi et al. | |
| 2014/0214309 A1 | 7/2014 | Atluru et al. | |
| 2014/0257678 A1* | 9/2014 | Boesch | F02D 45/00 701/112 |

(Continued)

*Primary Examiner* — George C Jin
(74) *Attorney, Agent, or Firm* — David B. Kelley; Brooks Kushman P.C.

(57) ABSTRACT

A vehicle controller may initiate an auto stop of an engine in response to a value of an auto stop parameter falling within a specified range and alter the specified range based on learned information derived from vehicle data to change a frequency or duration of auto stops of the engine.

7 Claims, 3 Drawing Sheets

(56) References Cited

U.S. PATENT DOCUMENTS

| | | | |
|---|---|---|---|
| 2014/0257679 A1* | 9/2014 | Boesch | F02D 17/04 701/112 |
| 2015/0233336 A1* | 8/2015 | Leatherland | F02N 11/0833 180/271 |

\* cited by examiner

AUTO STOP PARAMETER THRESHOLD ADJUSTMENT

TECHNICAL FIELD

This disclosure is related to strategies for altering thresholds that can trigger engine auto stops.

BACKGROUND

A stop-start vehicle may automatically stop its internal combustion engine for a period of time during intervals of a drive cycle when vehicle speed approaches or is equal to zero. These engine auto stops may improve fuel economy by reducing engine idle time and thus fuel consumption for the drive cycle.

SUMMARY

A vehicle includes an engine, and a controller that initiates an auto stop of the engine in response to a value of an auto stop parameter falling within a specified range and alters the specified range based on learned information derived from vehicle data to change a frequency or duration of auto stops of the engine.

A vehicle stop-start system includes a controller that adjusts an auto stop parameter threshold value associated with a particular geographic location according to learned information derived from vehicle data collected in a vicinity of the particular geographic location to alter a frequency or duration of engine auto stops at the particular geographic location. The threshold value when crossed causes the system to initiate an auto stop of an engine.

A method for operating a vehicle includes, in response to identifying a driver of the vehicle, altering by a controller a threshold value of an auto stop parameter based on drive cycle data associated with the driver such that a duration of engine auto stops for a specified drive cycle performed by the driver will be different than the duration for the specified drive cycle performed by a different identified driver. The threshold value when crossed causes an auto stop of an engine to be initiated.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention.

As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
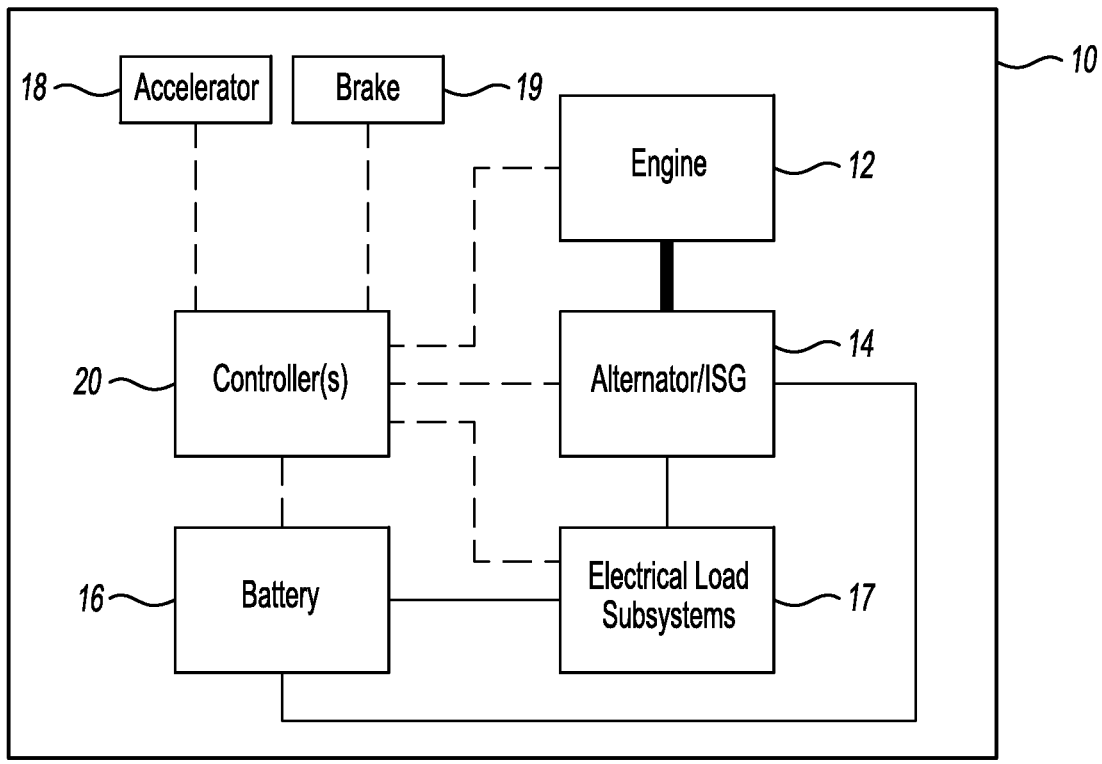
FIG. 1 is a block diagram of a vehicle.

Referring to FIG. 1, a vehicle 10 may include an engine 12, an alternator or integrated starter generator 14, a battery 16 (e.g., a 12 V battery), electrical load subsystems 17 (e.g., electric power steering assist system, electric park brake system, HVAC blower system, heated windshield system, etc.), and accelerator and brake pedals 18, 19 in communication with/under the control of one or more controllers 20 (as indicated by dashed line). The engine 12 is mechanically connected with the alternator or integrated starter generator 14 (as indicated by thick line) such that the engine 12 may drive the alternator or integrated starter generator 14 to generate electric current. The alternator or integrated starter generator 14 and battery 16 are electrically connected with each other and the electrical load subsystems 17 (as indicated by thin line). Hence, the alternator or integrated starter generator 14 may charge the battery 16; the electrical load subsystems 17 may consume electric current provided by the alternator or integrated starter generator 14 and/or battery 16. Other vehicle configurations, such as hybrid vehicle configurations, are also contemplated.

The controllers 20 may initiate an auto stop or auto start of the engine 12. As the vehicle 10 comes to a stop, for example, the controllers 20 may issue a command to begin the process to stop the engine 12. (Each of the terms "controller" and "controllers" can mean one or several controllers.) Stopping the engine 12 prevents the alternator or integrated starter generator 14 from providing electric current to the electrical load subsystems 17. The battery 16 may provide electric current to the electrical load subsystems 17 while the engine 12 is stopped.

As the brake pedal 19 is disengaged and/or the accelerator pedal 19 is engaged after an engine auto stop, the controllers 20 may issue a command to begin the process to start the engine 12, thus enabling the alternator or integrated starter generator 14 to provide electric current to the electrical load subsystems 17.

Figure 2:
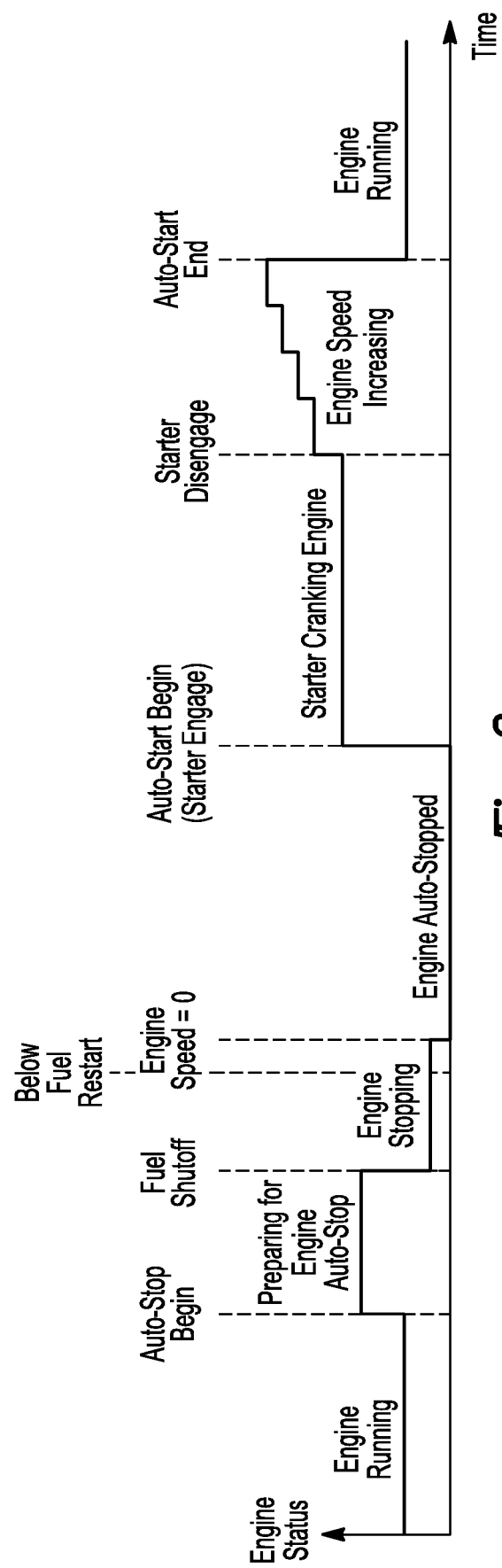
FIG. 2 is a plot of engine status versus time before, during and after an engine stop-start event.

Referring to FIG. 2, an engine auto stop event may include several stages. "Auto-stop begin" marks the beginning of the engine auto stop event. "Preparing for engine auto-stop" is the time period during which vehicle systems as well as the engine are prepared for the impending engine stop. If an auto stop inhibit condition is detected during this stage, the preparation for the impending engine stop is discontinued and the vehicle systems and engine are returned to their normal operating modes. "Fuel shutoff" marks the point at which fuel flow to the engine is stopped. "Engine stopping" is the time period during which the engine speed decreases to 0. "Below fuel restart" marks the point after which if a restart is requested during the "engine stopping" stage, the starter may need to be engaged to crank the engine. If a restart is requested before "below fuel restart" and during the "engine stopping" stage, the engine may be restarted by turning the flow of fuel back on. "Engine speed=0" marks the point at which the engine speed is near or equal to 0.

"Engine auto-stopped" is the time period during which the engine is off. "Starter engage" marks the point at which the starter starts to crank the engine in an effort to start the engine in response to detecting an engine auto start condition. "Starter cranking engine" is the time period during which the engine is unable to crank under its own power.

"Starter disengage" marks the point at which the engine is able to crank under its own power. "Engine speed increasing" is the time period during which the speed of the engine increases to its running speed (a speed at or above target idle speed). "Auto-start end" marks the point at which the speed of the engine achieves its running speed.

Referring again to FIG. 1, the controllers 20 may first determine whether values of certain system parameters fall within specified ranges prior to initiating an auto stop of the engine 12 (prior to "Auto-stop begin"). These "auto stop parameters" may include vehicle speed, driver demand (accelerator pedal position), rate of accelerator pedal tip-out, quantity of brake apply (brake pedal position), rate of brake pedal tip-out, battery state of charge, and electric current demand. Other system parameters such as maximum engine auto stop time, range of acceptable battery temperatures, etc., however, are also contemplated. As a simple example, the controllers 20 may determine if the battery state of charge is less than some predetermined threshold value. If so, the controllers 20 may not initiate an auto stop of the engine 12 as the vehicle 10 comes to a stop. Similarly, the controllers 20 may determine whether the quantity of brake apply is less than some predetermined threshold value as the vehicle speed falls below a threshold speed that would normally trigger an engine auto stop. If so, the controllers 20 may not initiate an auto stop of the engine 12.

Typically, the specified ranges mentioned above are static. That is, a threshold vehicle speed below which an auto stop of the engine 12 is initiated (assuming all other relevant parameters being considered fall within their respective specified ranges) is designated during manufacture. This, however, may preclude opportunistic auto stopping of the engine 12. An increase in the time the engine 12 is auto stopped may translate to an increase in fuel economy for a given drive cycle. As such, the earlier or more frequent auto stops of the engine 12 can be initiated (provided such auto stops are appropriate), the longer the engine 12 can be in a state of auto stop for a given drive cycle.

Here, learned information about drive cycles or portions of drive cycles is used to alter the parameter specified ranges for which auto stops are initiated. For example, a 5° per second rate of accelerator pedal tip-out at vehicle speeds less than 10 m.p.h. may initially trigger an auto stop of the engine 12. Using standard techniques however, the controllers 20 may learn that a particular driver usually brings the vehicle 10 to a stop when a 3° per second rate of accelerator pedal tip-out (or more) is used at vehicle speeds less than 10 m.p.h. As a result, the controllers 20 may reduce the rate of accelerator pedal tip-out threshold at which an auto stop of the engine 12 may be initiated for that driver. The controllers 20 may also learn that, regardless of the driver, the vehicle 10 is always brought to a stop in the vicinity of a particular geographic location provided a speed of the vehicle 10 is less than 25 m.p.h. (The controllers 20 may learn, for example, that the vehicle 10 is brought to a stop at a certain stop light location.) As a result, the controllers 20 may increase the speed at which an auto stop of the engine 12 may be initiated from, say, 10 m.p.h. to 15 m.p.h in the vicinity of that geographic location.

The extent to which the controllers 20 adjust the parameters can be based on a confidence associated with the learning. As the number of times (and/or frequency) the controllers 20 observe an increase in a certain repeatable behavior, for example, the affected auto stop parameter may be increased (or decreased as the case may be) to a limit. Continuing with one of the examples above, if the controllers 20 record data via a logging algorithm that indicate the vehicle 10 has been brought to a stop in the vicinity in question (8) out of the last (8) times the speed has been less than 25 m.p.h., the controllers 20 may increase the speed at which an auto stop of the engine 12 may be initiated from 10 m.p.h. (assuming this to be the default value) to 12.5 m.p.h for that geographic location. When the data indicates that the vehicle 10 has been brought to a stop in the vicinity in question (22) out of the last (24) times under the speed conditions noted, the controllers 20 may increase the speed at which an auto stop of the engine 12 may be initiated to 15 m.p.h. for that location, etc. until a predefined limit is achieved. As a result, auto stop duration may be increased for routes passing through that geographic location because auto stops of the engine 12 are initiated earlier as compared with default conditions.

Such auto stop parameter adjustment can also reduce auto stop duration or preclude auto stop all together. If the controllers 20 record data that indicate, for example, the vehicle 10 does not stop (5) out of the last (6) times the speed has fallen below 10 m.p.h. (the default value), the controllers 20 may decrease the speed at which an auto stop of the engine 12 may be initiated to 8 m.p.h., etc. Even though this may reduce auto stop duration in certain circumstances, it may also reduce the number of times an auto stop of the engine 12 is initiated only to be cancelled because of changed operating conditions. Put a different way, the threshold value associated with a particular auto stop parameter may vary over time (e.g., it could be higher at certain times and lower at other times) according to the behavior experienced by the vehicle 10 as it is driven.

The examples above describe several of the many scenarios possible. Table 1 provides a list of example auto stop parameters (of course there are others) and how threshold values associated therewith may be altered to increase auto stop duration or increase the probability of an auto stop. Although not listed in the table, the threshold values would be altered in an opposite manner to decrease auto stop duration or decrease the probability of an auto stop. (If increasing the vehicle speed threshold increases auto stop duration or the probability of an auto stop, then decreasing the vehicle speed threshold decreases auto stop duration or the probability of an auto stop.)

TABLE 1

| Auto Stop Parameter | Change in Threshold Value to Increase Auto Stop Duration or Increase Probability of Engine Auto Stop |
|---|---|
| Vehicle Speed | Increase |
| Driver Demand | Increase |
| Rate of Accelerator Pedal Tip-Out | Decrease |
| Quantity of Brake Apply | Decrease |
| Rate of Brake Pedal Tip-Out | Decrease |
| Battery State of Charge | Decrease |
| Electric Current Demand | Increase |

Various machine learning or pattern recognition techniques, etc. can be employed by the controllers 20 to facilitate the decision as to whether and in what manner to alter any given auto stop parameter threshold. Examples may include artificial neural networks, association rule learning, Bayesian networks, clustering, decision tree learning, genetic algorithms, inductive logic programming, reinforcement learning, representation learning, similarity and metric learning, sparse dictionary learning, support vector machines, etc. Many of these techniques may require data that describe how the vehicle is operated during a given drive cycle and/or in certain geographic locations. As known in the art, vehicles are outfitted with a variety of sensors to monitor such things as accelerator pedal position, brake pedal position, current load, driver identity, engine on/off state, geographic location, vehicle speed, and vehicle surroundings. Certain vehicles are also outfitted with telematics to enable acquisition of data concerning, for example, forward vehicle location, stop light location, traffic speed, etc. from other vehicles and remote facilities. And data from such sensors and telematics are typically made available on the communication networks within the vehicles. As such, the controllers 20 may acquire this data from the communication network to which they are connected for the purpose of executing the chosen learning technique.

Continuing with the example above, the controllers 20 may acquire data for each of several identified drivers regarding routes traveled and operation of the vehicle 10 (including engine stop-start behavior) over the routes traveled. A camera, personalized key fob or driver input can indicate driver identity. An engine speed sensor can indicate the on/off state of the engine 12, a navigation system can track the vehicle routes and locations, and so on. Less sophisticated implementations may not, for example, identify particular drivers or geographic locations. That is, they may monitor vehicle operation without regard to driver or geographic location. The extent to which the auto stop parameters can be fine tuned, however, may be less than circumstances in which more types of data are available.

Figure 3:
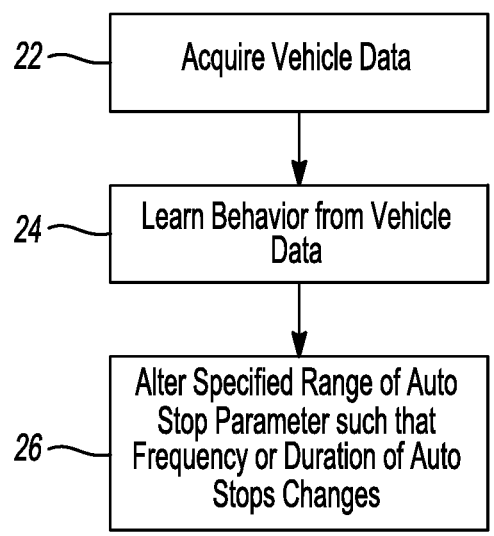
FIGS. 3-5 are flow charts of algorithms for controlling engine auto stops.

Referring to FIG. 3, vehicle data is acquired at operation 22. Drive cycle data, for example, may be collected via sensors and/or telematics. At operation 24, behavior is learned from the vehicle data. A neural network may be used to uncover patterns between engine stop-starts and other vehicle operational parameters such as vehicle speed, engine temperature, etc. A specified range for an auto stop parameter, at operation 26, is altered such that a frequency or duration of auto stops changes. A battery state of charge threshold (above which an engine auto stop may be initiated) may be lowered to increase the range of acceptable states of charge at which an engine auto stop may be initiated. As a result, the frequency of engine auto stops for a specified drive cycle (a given route and a given speed schedule for that route) increases.

Figure 4:
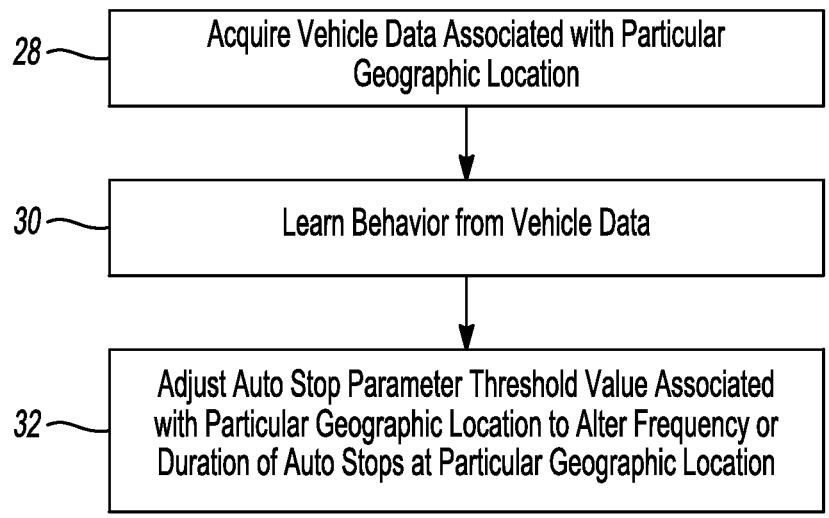

Referring to FIG. 4, vehicle data associated with a particular geographic location is acquired at operation 28. Parameters associated with vehicle operation at geographic location X, Y may be collected via sensors and/or telematics. At operation 30, behavior is learned from the vehicle data. An algorithm may be used to identify stop-start patterns at the geographic location X, Y. And at operation 32, an auto stop parameter threshold value associated with the particular geographic location is adjusted to alter a frequency or duration of auto stops at the particular geographic location. An acceptable amount of auxiliary electrical current demand (tied to the geographic location X, Y) may be increased so that the probability of an auto stop at the geographic location X, Y increases.

Figure 5:
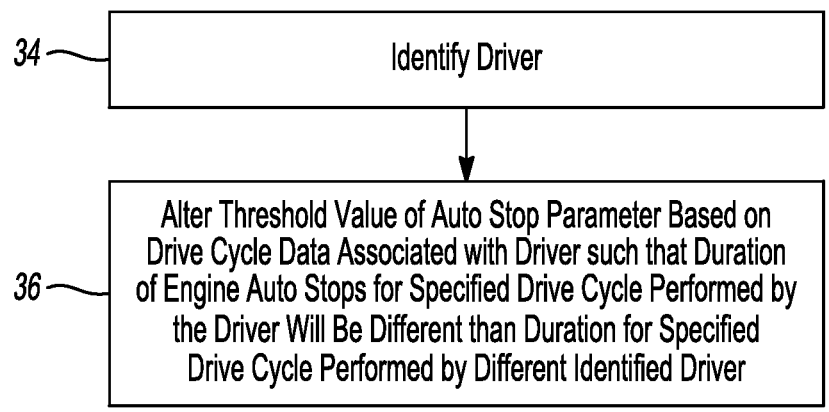

Referring to FIG. 5, a driver is identified at operation 34. A mobile device (e.g., cell phone, unique key, etc.) associated with a particular driver may be identified. A vision system may observe and identify the driver. A driver or occupant may input driver identity via an interface. A threshold value of an auto stop parameter, at operation 36, is altered based on drive cycle data associated with the driver such that a duration of engine auto stops for a specified drive cycle performed by the driver will be different than the duration for the specified drive cycle performed by a different identified driver. A time delay between accelerator pedal tip-out and initiation of engine auto stop may be increased so that engine auto stops become less likely for a given drive cycle (relative to a different identified driver having a different assigned time delay) if analysis of previous drive cycle data for the identified driver reveals that they handle the vehicle in such a way that auto stops are counter productive to increasing fuel efficiency.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle stop-start system comprising:
a controller programmed to adjust a threshold, defining a specified range of values for a geographic location, according to learned information derived from vehicle data collected in a vicinity of the geographic location to alter a frequency or duration of engine auto stops at the geographic location, and to initiate an auto stop of an engine responsive to a parameter value falling within the specified range.

2. The system of claim 1, wherein adjusting the threshold includes increasing the threshold.

3. The system of claim 1, wherein adjusting the threshold includes decreasing the threshold.

4. The system of claim 1, wherein the parameter value describes a vehicle speed.

5. The system of claim 1, wherein the parameter value describes a rate of accelerator pedal tip-out.

6. The system of claim 1, wherein the parameter value describes a quantity of brake apply.

7. The system of claim 1, wherein the parameter value describes a rate of brake pedal tip-out.

* * * * *